(No Model.) 2 Sheets—Sheet 1.

W. EVERT.
CORN CULTIVATING MACHINE.

No. 597,817. Patented Jan. 25, 1898.

Witnesses:
J. S. Borrew
J. A. Willson

Inventor.
Wm Evert,
by A. B. Willson
Attorney (No Model.) 2 Sheets—Sheet 2.

W. EVERT.
CORN CULTIVATING MACHINE.

No. 597,817. Patented Jan. 25, 1898.

Witnesses:
J. S. Bowen.
J. A. Wilson.

Inventor
Wm Evert,
by H. B. Wilson
Attorney

THE NORRIS PETERS CO., PHOTO-LITHO., WASHINGTON, D. C.

UNITED STATES PATENT OFFICE.

WILLIAM EVERT, OF ASHERVILLE, KANSAS.

CORN-CULTIVATING MACHINE.

SPECIFICATION forming part of Letters Patent No. 597,817, dated January 25, 1898.

Application filed May 25, 1897. Serial No. 638,135. (No model.)

*To all whom it may concern:*

Be it known that I, WILLIAM EVERT, a citizen of the United States, residing at Asherville, in the county of Mitchell and State of Kansas, have invented certain new and useful Improvements in Corn-Cultivating Machines; and I do declare the following to be a full, clear, and exact description of the invention, such as will enable others skilled in the art to which it appertains to make and use the same.

My invention has relation to cultivators, and more especially to machines for cultivating listed corn, whereby the weeds are removed and the ridge loosened.

With this object in view the invention consists in certain features of construction and combination of parts which will be hereinafter fully set forth.

Figure 1:
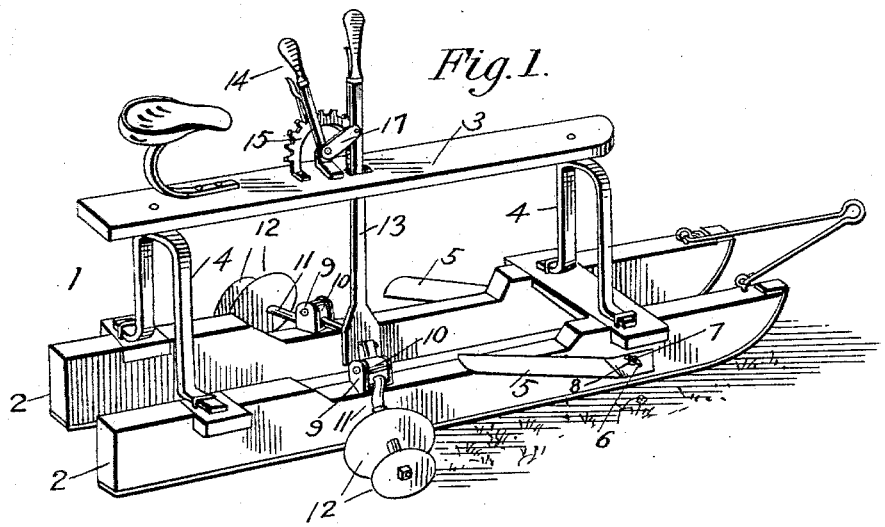
Figure 2:
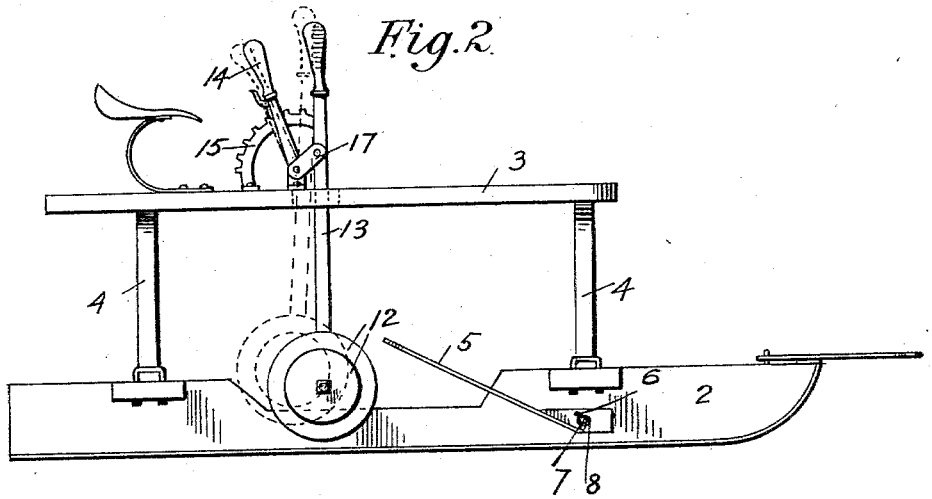
Figure 3:
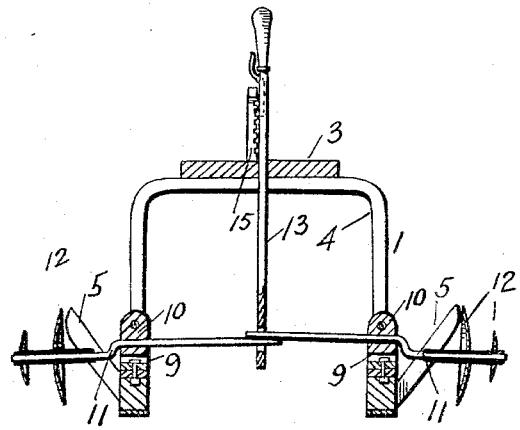
Figure 4:
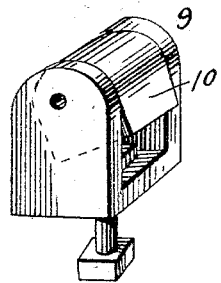

In the accompanying drawings, Figure 1 is a perspective view of my improved cultivator. Fig. 2 is a side elevation of the same, showing in dotted lines the disks adjusted laterally and vertically. Fig. 3 is a transverse sectional view, and Fig. 4 is an enlarged view of the swiveled yoke and bearing-block.

In said drawings, 1 denotes the frame of the machine, which consists of two runners 2 and a seat-platform 3, connected thereto by yokes 4. Secured to the sides of the runner and projecting rearwardly and upwardly therefrom are cutters 5, the purpose of which is to cut the weeds from the sides of the ridges and also work down a little soil to the corn. The forward ends of these knives are bent parallel with the runners and are provided with a curved slot 6, through which passes a bolt 7, provided with a washer 8, whereby the cutters may be swung up and down on their pivot-posts for adjustment and be retained in their adjusted positions.

9 denotes two yokes swiveled in the upper edges of the runners, and pivoted between the arms of the yoke are journal-blocks 10, each of which supports a crank-axle 11, the inner ends of which overlap, and to the outer ends of which are sleeved two cultivating-disks 12 of different diameters. The larger disks are adapted to agitate the side of the ridge without working down too much soil, while the smaller disks are adapted to agitate or loosen the soil on top of the ridge. The overlapping ends of these crank-axles project through a slot in the end of an actuating-lever 13, which is pivoted to the seat-frame and is provided with a spring-dog to engage the segmental rack 15, by means of which the cultivating-disks may be swung into or away from the runners.

14 denotes a crank-lever which is pivoted to the seat-frame and has its crank-arm connected to the operating-lever by means of a pivot-link 17. This crank-lever is also provided with a spring-dog which is adapted to engage the segmental rack and is designed for raising and lowering the cultivator-disks to enable the disks to work ridges of different heights.

From the foregoing description, taken in connection with the accompanying drawings, the construction and operation of the invention will be readily understood without requiring further explanation.

The machine, while especially adapted for cultivating listed corn, may also be used with equal facility in cultivating corn planted by a check-rower.

Although I have specifically described the construction and relative arrangement of the several elements of my invention, I do not desire to be confined to the same, as such changes or modifications may be made as clearly fall within the scope of my invention without departing from the spirit thereof.

Having thus described my invention, what I claim, and desire to secure by Letters Patent, is—

1. A corn-cultivator, consisting of a main frame and cultivator-disks supported thereby in a universal bearing, said disks having a laterally-swinging adjustment fore and aft in the arc of a circle and a vertically-swinging adjustment toward and away from the ground in the arc of a circle, substantially as described.

2. A corn-cultivator consisting of parallel runners, yokes swiveled to said runners, journal-blocks pivoted in said yokes, crank-axles journaled in said blocks and having their inner ends overlapping, disks of different diameters sleeved upon the outer ends of said axles, a pivoted operating-lever having an aperture at its lower end through which the overlapping ends of the axles project, a segmental rack-bar, a crank-lever, a link connecting the crank of said lever to the actuating-lever, and spring-dogs carried by said levers to engage the said rack-bar, substantially as set forth.

In testimony whereof I hereunto affix my signature in presence of two witnesses.

WM. EVERT.

Witnesses:
J. M. CLANIN,
S. G. REES.